(12) United States Patent
Nakajima

(10) Patent No.: US 8,625,002 B2
(45) Date of Patent: Jan. 7, 2014

(54) IMAGE PROCESSING APPARATUS AND CONTROL METHOD THEREOF FOR USE IN MULTIPLEXING IMAGE DATA AND ADDITIONAL INFORMATION

(75) Inventor: Hirofumi Nakajima, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 13/111,267

(22) Filed: May 19, 2011

(65) Prior Publication Data

US 2011/0292250 A1     Dec. 1, 2011

(30) Foreign Application Priority Data

May 31, 2010  (JP) ................................. 2010-124175
Mar. 24, 2011  (JP) ................................. 2011-065787

(51) Int. Cl.
*H04N 5/76*   (2006.01)
*H04N 5/92*   (2006.01)

(52) U.S. Cl.
USPC ....................................... 348/231.3; 386/337

(58) Field of Classification Search
USPC ........ 348/231.99, 231.2, 231.3, 231.5, 231.6, 348/333.02; 386/328, 337, 338
See application file for complete search history.

(56) References Cited

U.S. PATENT DOCUMENTS

| 2004/0141070 A1* | 7/2004 | Chiku et al. ............. 348/231.99 |
| 2007/0035639 A1* | 2/2007 | Aridome et al. ........... 348/231.3 |
| 2009/0052875 A1* | 2/2009 | Morimoto et al. ............ 386/131 |
| 2009/0322906 A1* | 12/2009 | Watanabe ................ 348/231.99 |

FOREIGN PATENT DOCUMENTS

| CN | 1799257 A | 7/2006 |
| CN | 101373624 A | 2/2009 |
| JP | 2009-049726 | 3/2009 |

OTHER PUBLICATIONS

The above references were cited in a Jun. 4, 2013 Chinese Office Action, which is enclosed with an English Translation, that issued in Chinese Patent Application No. 201110145308.

* cited by examiner

*Primary Examiner* — Kelly L Jerabek
(74) *Attorney, Agent, or Firm* — Cowan, Liebowitz & Latman, P.C.

(57) ABSTRACT

An image processing apparatus controls such that a plurality of additional information of image data are classified into a plurality of objects in accordance with update periods thereof and data of the additional ingenerateation corresponding to each of the classified objects is generated and output in accordance with the corresponding update period of each object, thereby multiplexing the data of the additional information corresponding to each object which is generated and output in accordance with update period thereof, to the input image data. The image processing apparatus demultiplexes the multiplexed data into the image data and the additional information, generates updated image data of the object to be updated from the demultiplexed additional information, and superimposes it to the video image corresponding to the image data.

9 Claims, 14 Drawing Sheets

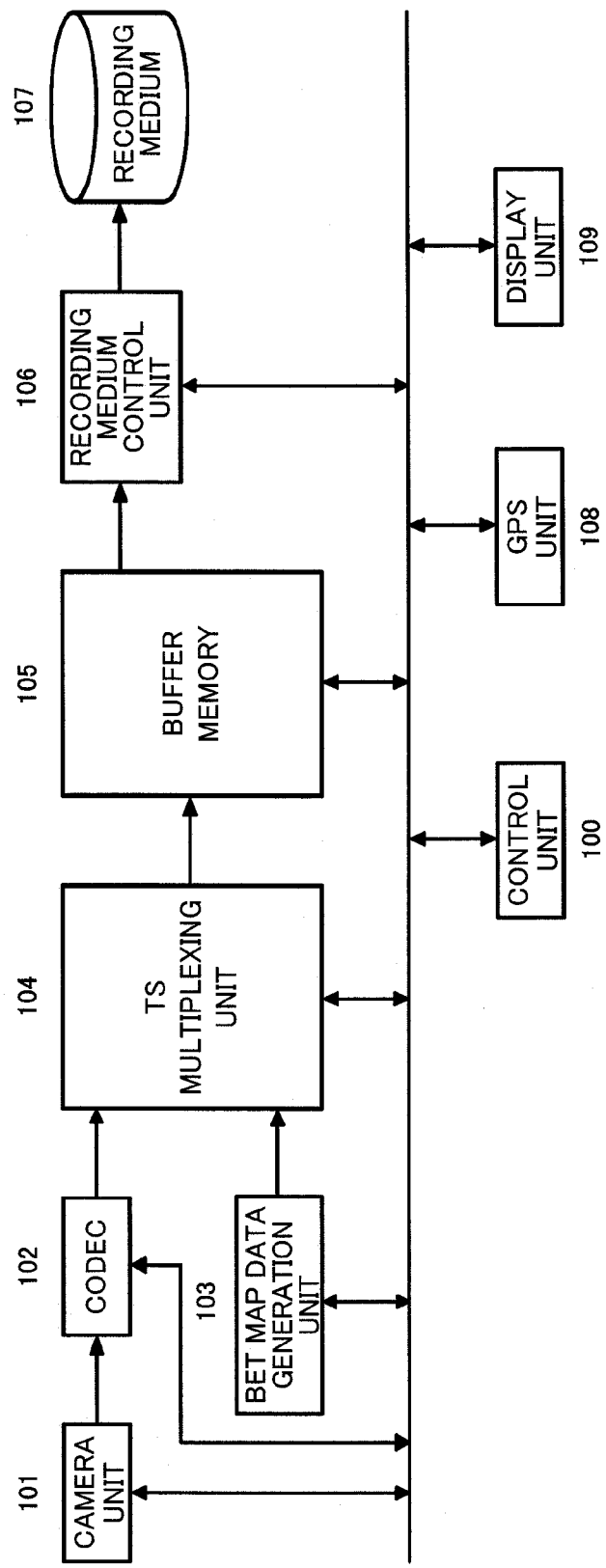

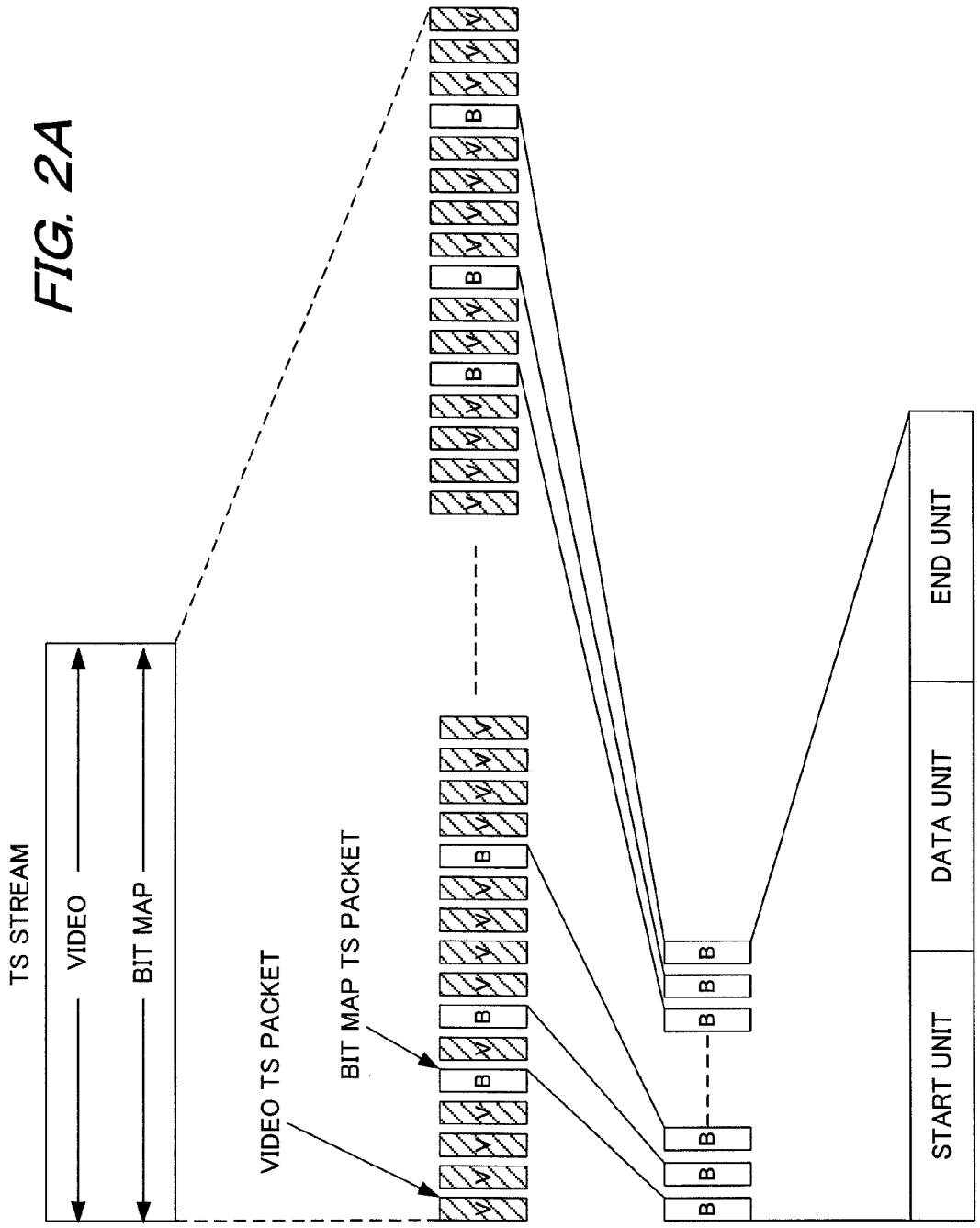

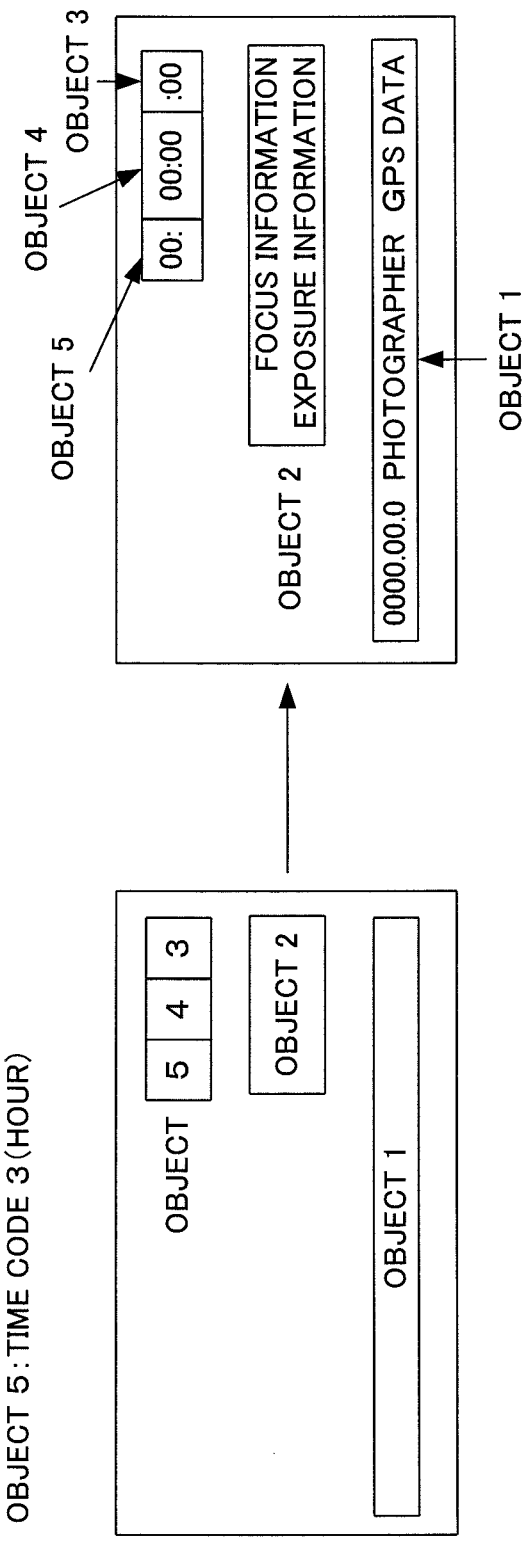

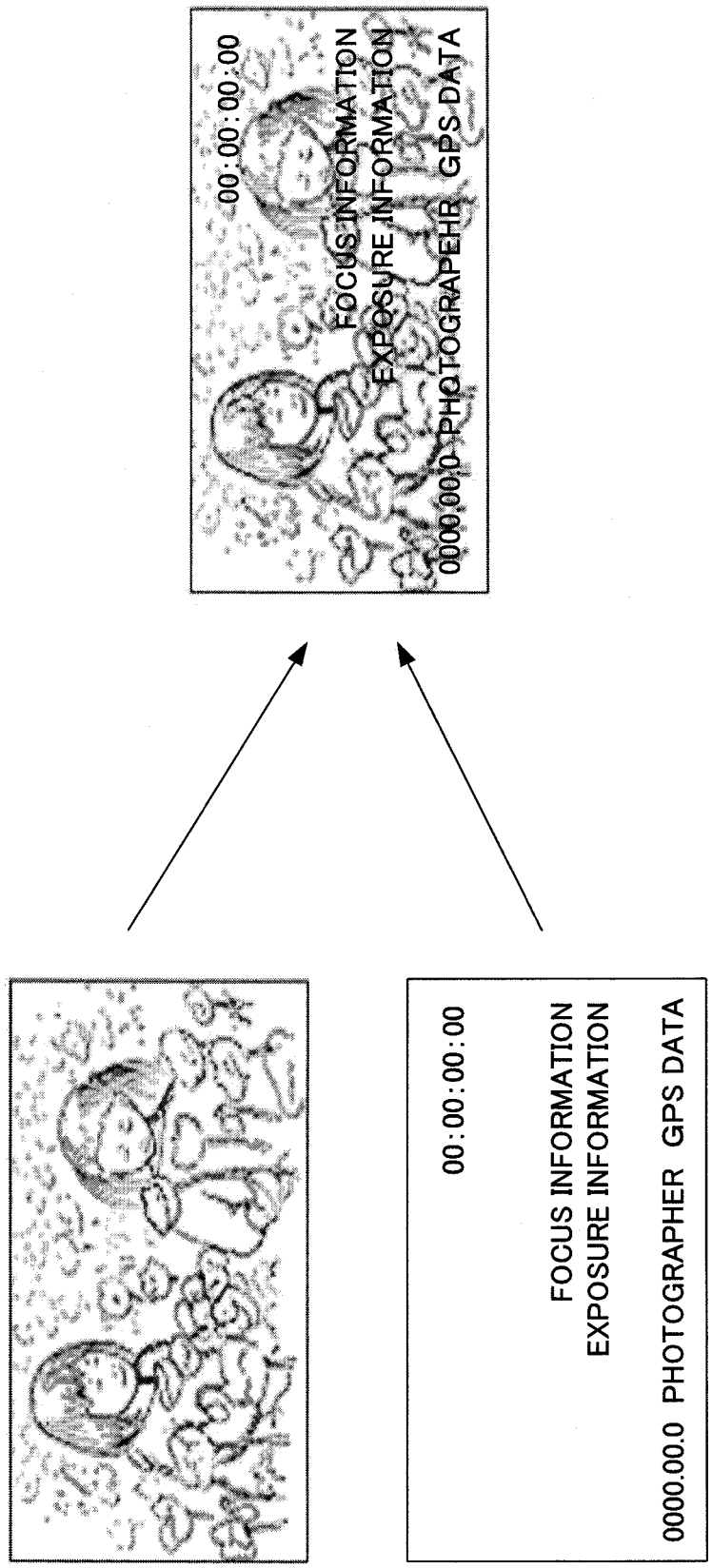

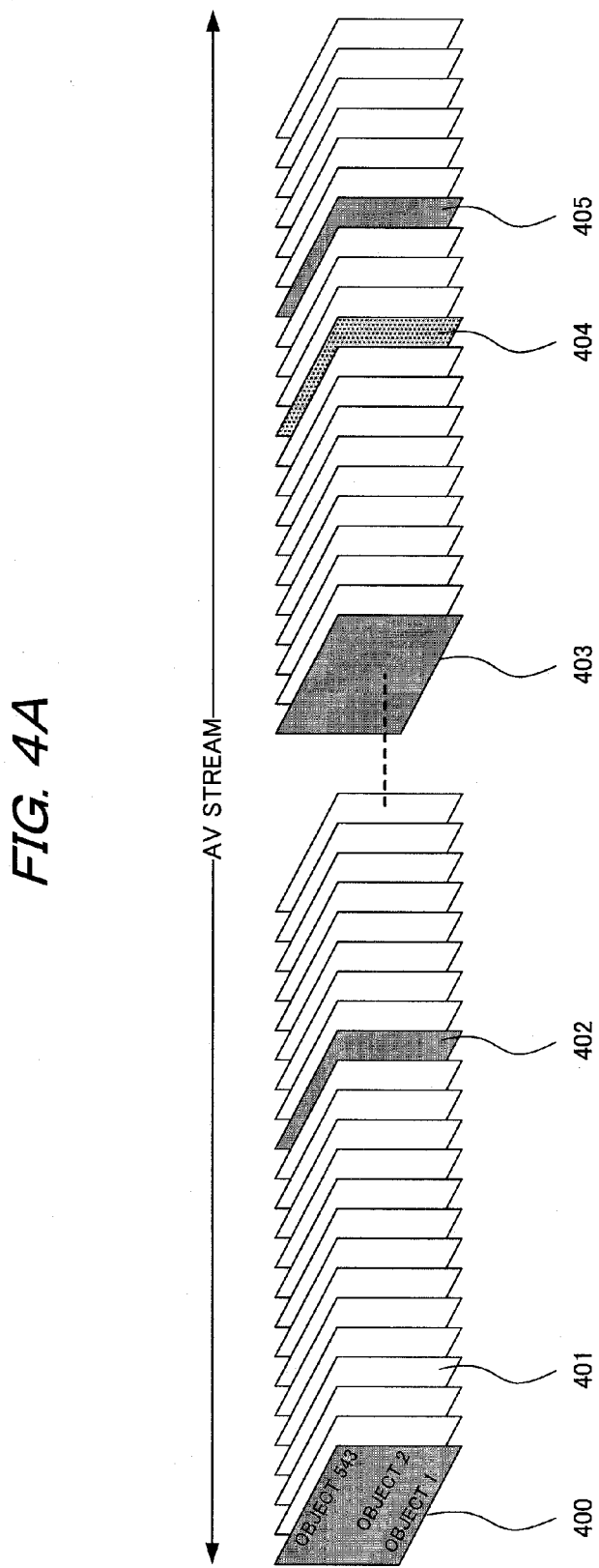

FIG. 4B

IN THE START FRAMES 400 AND 404,
ALL OBJECT ARE MULTIPLEXED

| |
|---|
| START UNIT<br>  UNIT IDENTIFIER  xxx<br>  NUMBER OF OBJECT  5<br>  OBJECT ID  1<br>  [1]HORIZONTAL SCREEN POSITION OF OBJECT<br>  [1]VERTICAL SCREEN POSITION OF OBJECT<br>  OBJECT ID  2<br>  [2]HORIZONTAL SCREEN POSITION OF OBJECT<br>  [2]VERTICAL SCREEN POSITION OF OBJECT<br>  OBJECT ID  3<br>  [3]HORIZONTAL SCREEN POSITION OF OBJECT<br>  [3]VERTICAL SCREEN POSITION OF OBJECT<br>  OBJECT ID  4<br>  [4]HORIZONTAL SCREEN POSITION OF OBJECT<br>  [4]VERTICAL SCREEN POSITION OF OBJECT<br>  OBJECT ID  5<br>  [5]HORIZONTAL SCREEN POSITION OF OBJECT<br>  [5]VERTICAL SCREEN POSITION OF OBJECT |
| DATA UNIT<br>  UNIT IDENTIFIER  xxx<br>  OBJECT ID 1<br>  [1]OBJECT WIDTH<br>  [1]OBJECT LENGTH<br>  [1]OBJECT DATA<br>  OBJECT ID 2<br>  [2]OBJECT WIDTH<br>  [2]OBJECT LENGTH<br>  [2]OBJECT DATA<br>  OBJECT ID 3<br>  [3]OBJECT WIDTH<br>  [3]OBJECT LENGTH<br>  [3]OBJECT DATA<br>  OBJECT ID 4<br>  [4]OBJECT WIDTH<br>  [4]OBJECT LENGTH<br>  [4]OBJECT DATA<br>  OBJECT ID 5<br>  [5]OBJECT WIDTH<br>  [5]OBJECT LENGTH<br>  [5]OBJECT DATA |
| END UNIT<br>  UNIT IDENTIFIER  xxx |

OBJECT 1 : PHOTOGRAPHY DATE, PHOTOGRAPHER, GPS INFORMATION
OBJECT 2 : FOCUS, EXPOSURE INFORMATION
OBJECT 3 : TIME CODE 1 (FRAME)
OBJECT 4 : TIME CODE 2 (SECOND, MINUTE)
OBJECT 5 : TIME CODE 3 (HOUR)

FIG. 4C

MULTIPLEXED IN OTHER FRAME 401

| START UNIT |
| --- |
|   UNIT IDENTIFIER  xxx<br>  NUMBER OF OBJECT  2<br>  OBJECT ID  2<br>  [2]HORIZONTAL SCREEN POSITION OF OBJECT<br>  [2]VERTICAL SCREEN POSITION OF OBJECT<br>  OBJECT ID  3<br>  [3]HORIZONTAL SCREEN POSITION OF OBJECT<br>  [3]VERTICAL SCREEN POSITION OF OBJECT |
| DATA UNIT<br>  UNIT IDENTIFIER  xxx<br>  OBJECT ID 2<br>  [2]OBJECT WIDTH<br>  [2]OBJECT LENGTH<br>  [2]OBJECT DATA<br>  OBJECT ID 3<br>  [3]OBJECT WIDTH<br>  [3]OBJECT LENGTH<br>  [3]OBJECT DATA |
| END UNIT<br>  UNIT IDENTIFIER  xxx |

OBJECT 1 : PHOTOGRAPHY DATE, PHOTOGRAPHER, GPS INFORMATION
OBJECT 2 : FOCUS, EXPOSURE INFORMATION
OBJECT 3 : TIME CODE 1 (FRAME)
OBJECT 4 : TIME CODE 2 (SECOND, MINUTE)
OBJECT 5 : TIME CODE 3 (HOUR)

FIG. 4D

MULTIPLEXING FOR EVERY I-PICTURE
FRAMES 402, 403 AND 405

| |
|---|
| START UNIT<br>  UNIT IDENTIFIER  xxx<br>  NUMBER OF OBJECT  3<br>  OBJECT ID  2<br>  [2]HORIZONTAL SCREEN POSITION OF OBJECT<br>  [2]VERTICAL SCREEN POSITION OF OBJECT<br>  OBJECT ID  3<br>  [3]HORIZONTAL SCREEN POSITION OF OBJECT<br>  [3]VERTICAL SCREEN POSITION OF OBJECT<br>  OBJECT ID  4<br>  [4]HORIZONTAL SCREEN POSITION OF OBJECT<br>  [4]VERTICAL SCREEN POSITION OF OBJECT |
| DATA UNIT<br>  UNIT IDENTIFIER  xxx<br>  OBJECT ID 2<br>  [2]OBJECT WIDTH<br>  [2]OBJECT LENGTH<br>  [2]OBJECT DATA<br>  OBJECT ID 3<br>  [3]OBJECT WIDTH<br>  [3]OBJECT LENGTH<br>  [3]OBJECT DATA<br>  OBJECT ID 4<br>  [4]OBJECT WIDTH<br>  [4]OBJECT LENGTH<br>  [4]OBJECT DATA |
| END UNIT<br>  UNIT IDENTIFIER  xxx |

OBJECT 1 : PHOTOGRAPHY DATE, PHOTOGRAPHER, GPS INFORMATION
OBJECT 2 : FOCUS, EXPOSURE INFORMATION
OBJECT 3 : TIME CODE 1 (FRAME)
OBJECT 4 : TIME CODE 2 (SECOND, MINUTE)
OBJECT 5 : TIME CODE 3 (HOUR)

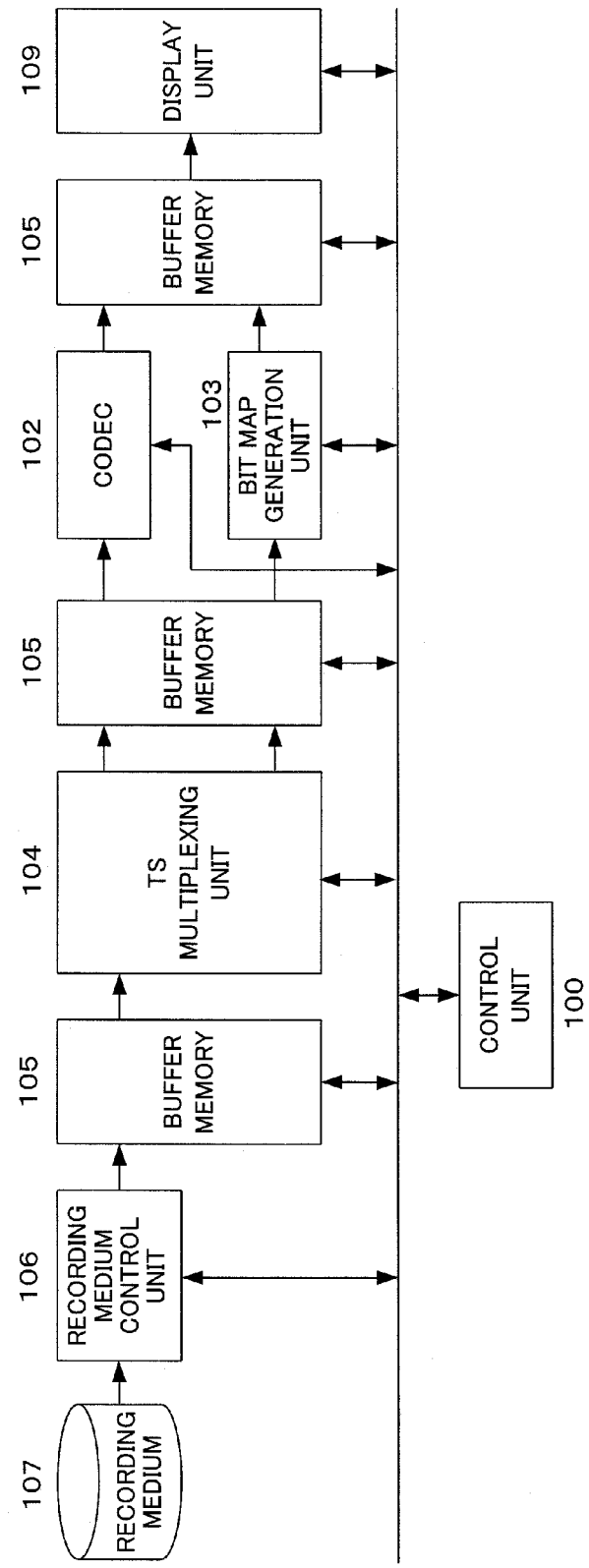

FIG. 8C

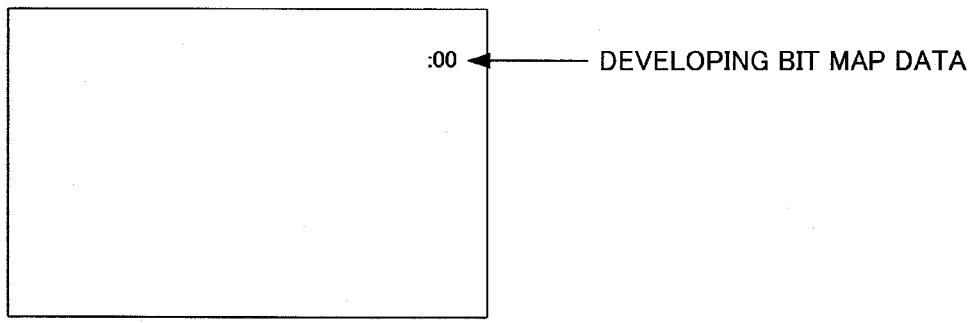

BUFFER MEMORY 1
(FRAME MEMORY FOR DEVOLOPING)

:00 ◄—— DEVELOPING BIT MAP DATA

FIG. 8D

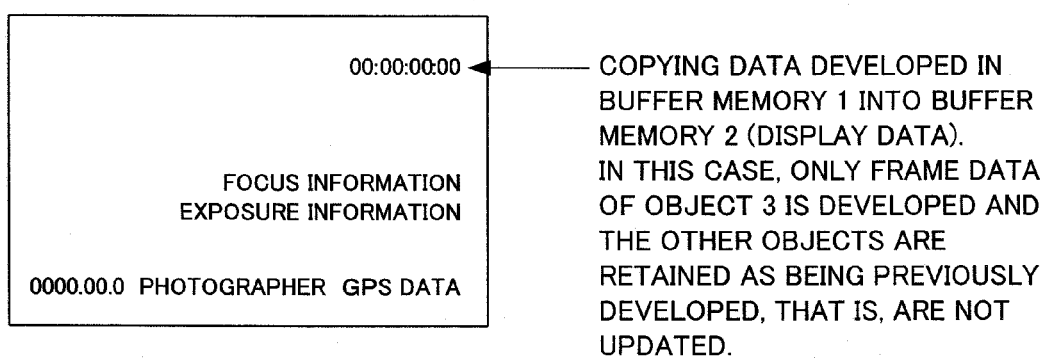

BUFFER MEMORY 2
(FRAME MEMORY FOR DISPLAYING)

00:00:00:00 ◄—— COPYING DATA DEVELOPED IN BUFFER MEMORY 1 INTO BUFFER MEMORY 2 (DISPLAY DATA).
IN THIS CASE, ONLY FRAME DATA OF OBJECT 3 IS DEVELOPED AND THE OTHER OBJECTS ARE RETAINED AS BEING PREVIOUSLY DEVELOPED, THAT IS, ARE NOT UPDATED.

FOCUS INFORMATION
EXPOSURE INFORMATION 0000.00.0 PHOTOGRAPHER GPS DATA

IMAGE PROCESSING APPARATUS AND CONTROL METHOD THEREOF FOR USE IN MULTIPLEXING IMAGE DATA AND ADDITIONAL INFORMATION

BACKGROUND OF THE INVENTION

1. Field of the Invention

The present invention relates to an image processing apparatus of image data photographed by a digital video camera or the like and, more particularly, to an image processing technique for superimposing bit map data to moving image stream data.

2. Description of the Related Art

There is a recording apparatus such as a video camera or the like for recording, together with moving image data, additional information such as date and time of a moving image photographing and photographing camera information onto a recording medium such as digital versatile disk (DVD), hard disk drive (HDD), memory card, or the like.

In such a recording apparatus, the moving image data is compression-encoded by using a method such as MPEG2, H.264, or the like and recorded.

The additional information is generated as bit map data and then is run-length encoded.

The encoded moving image data and bit map data are multiplexed into an MPEG-TS (transport stream) generateat and recorded onto the recording medium as a steam file of the TS format.

Since the additional information is overlay bit map data (caption data) which has been multiplexed into the stream of the TS format, it can be reproduced and displayed by a reproducing apparatus which conforms with a display rule of the overlay bit map data.

From such a situation, in the Official Gazette of Japanese Patent Application Laid-Open No. 2009-49726, such a technique that the additional information recorded in the stream as meta data in accordance with a unique rule is converted into overlay bit map data and recorded has been proposed. By such a technique, such additional information can be reproduced and displayed even in the reproducing apparatus which conforms with the display rule of the overlay bit map data.

However, since the bit map data is very large data, there is such a problem that unless a bit rate of the moving image data is not reduced, a bit rate of the whole moving image processing system cannot be maintained, when a large amount of additional information is multiplexed.

It is, therefore, an object of the invention to provide an image processing apparatus which can efficiently multiplex bit map data to image data in a moving image processing for multiplexing an overlay bit map to a moving image.

SUMMARY OF THE INVENTION

To solve the above problem, according to an aspect of the invention, an image processing apparatus comprises: an input unit configured to input image data; a data generation unit configured to generate data of a plurality of additional information regarding the image data; an image processing unit configured to generate stream data by multiplexing the data of the additional information generated by the data generation unit and the image data which is input by the input unit; and a control unit configured to control the data generation unit such that the plurality of additional information are classified into a plurality of objects in accordance with update periods thereof and the data of the additional information corresponding to each of the classified objects is generated and output in accordance with the update period of each object, wherein the image processing unit multiplexes to the image data the data of the additional information corresponding to each object which is output from the data generation unit in accordance with the update period thereof.

According to the invention, in the moving image processing for multiplexing an overlay bit map to the moving image, an affect on a bit rate of the image data, caused by the multiplexing, can be reduced as much as possible. Therefore, a stream in which the additional information is multiplexed can be generated while keeping high picture quality of the moving image.

Further features of the present invention will become apparent from the following description of exemplary embodiments with reference to the attached drawings.

BRIEF DESCRIPTION OF THE DRAWINGS

FIG. 1 is a block diagram of a recording apparatus having an image processing apparatus according to the first embodiment of the invention.

FIGS. 2A and 2B are diagrams for describing a construction of a stream of a TS format which is generated in accordance with the first embodiment of the invention.

FIGS. 3A and 3B are diagrams illustrating an example of a display of bit map data according to the first embodiment of the invention.

FIGS. 4A, 4B, 4C and 4D are conceptual diagrams of an AV stream according to the first embodiment of the invention.

FIG. 5 is a block diagram of a reproducing apparatus having an image processing apparatus according to the second embodiment of the invention.

FIGS. 8A, 8B, 8C and 8D are diagrams illustrating contents in a buffer memory of the bit map data generation unit in the reproducing operation according to the second embodiment of the invention.

DESCRIPTION OF THE EMBODIMENTS

Subsequently, exemplary embodiments of the invention will be described in detail hereinbelow with reference to the drawings. The embodiments which will be described hereinbelow are examples for realizing the invention and should be properly modified or changed in accordance with a construction of an apparatus to which the invention is applied and various kinds of conditions. In this meaning, the invention is not limited to the following embodiments.

First Embodiment

First, an outline of a stream of the MPEG2-TS format (hereinbelow, TS stream) regarding the first embodiment of the invention will be described with reference to FIGS. 2A and 2B.

In the TS stream of the embodiment, as illustrated in FIG. 2A, image data and bit map data are multiplexed. In more detail, each of them is multiplexed as packetized data to a TS packet.

The image data is constructed by data V (hereinbelow, VIDEO TS packet V) obtained by packetizing the data encoded by using an encoding method such as MPEG2, H.264, or the like. The bit map data is constructed by data B (hereinbelow, BITMAP TS packet B) obtained by packetizing the data in which the additional information of the image data is encoded by a run-length encoding.

The bit map data itself has been multiplexed as illustrated in FIG. 2A and is constructed by a start unit, a data unit, and an end unit.

Figure 2B:
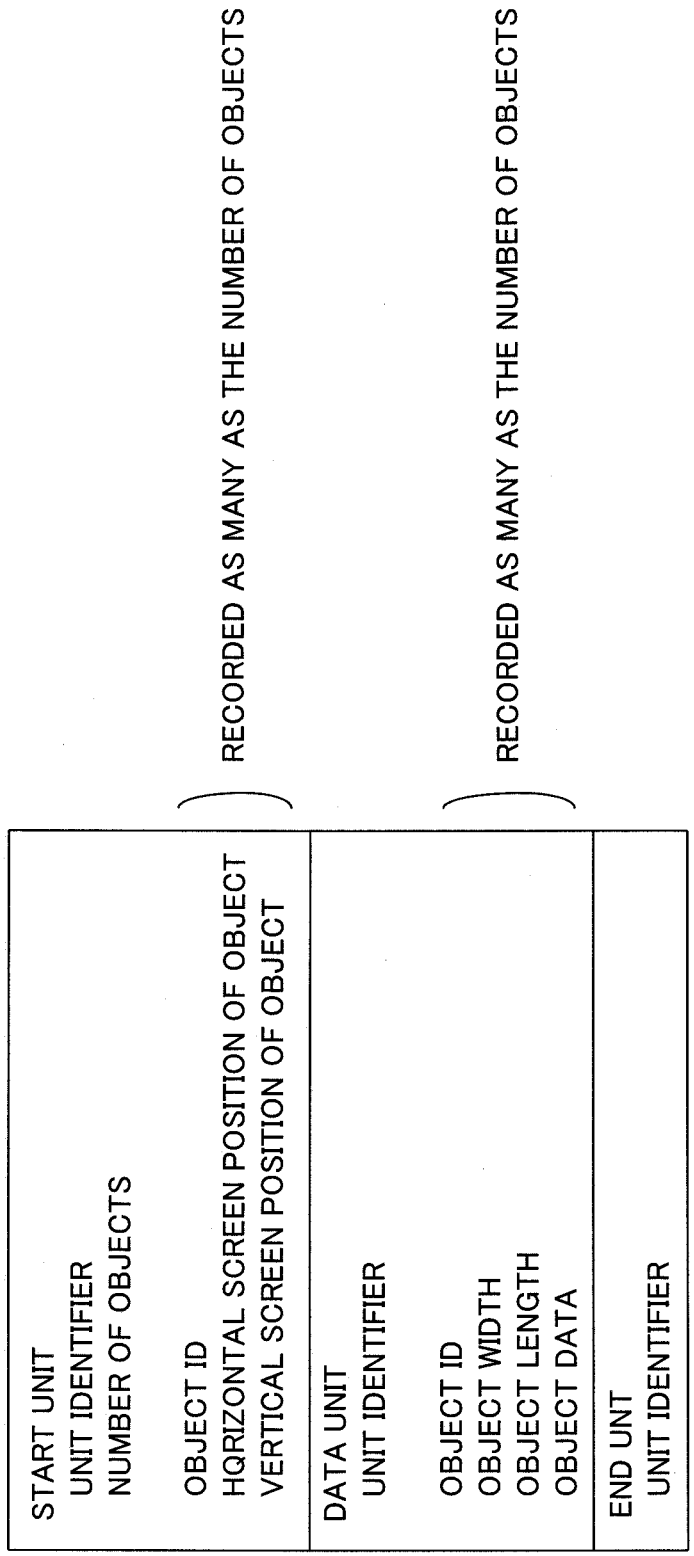

As illustrated in FIG. 2B, besides a unit identifier showing the start unit, the number of objects, an ID of each object, a position on a display screen in the horizontal direction of each object, and a position on the display screen in the vertical direction of each object are recorded in the start unit. Besides a unit identifier showing the data unit, a width in the horizontal direction of each object, a length in the vertical direction of each object, and run-length data are recorded in the data unit. A unit identifier showing the end unit is recorded in the end unit. Based on those data, a template (area data) defining a display area of each object and data (update data) to be displayed are provided as shown in FIG. 3A.

Subsequently, the first embodiment in which the invention is applied to a moving image recording apparatus will be described with reference to FIG. 1. FIG. 1 is a block diagram illustrating a construction of the moving image recording apparatus.

A control unit 100 having a computer such as a CPU or the like controls the whole recording apparatus.

A camera unit 101 has an image pickup sensor such as charge coupled device (CCD), complementary metal-oxide semiconductor (CMOS), or the like for converting an image which is input through a lens into an electric signal. The camera unit 101 outputs the photographed video image as digital data (image data) to an encoder/decoder (codec) 102. At the same time, as camera information regarding control of the photographing operation, the camera unit 101 outputs focus information and exposure information to the control unit 100.

The encoder/decoder (codec) 102 encodes or decodes the input image data. The encoding method is MPEG2, H.264, or the like.

A bit map data generation unit 103 generates bit map data obtained by run-length encoding an image (additional information) to be superimposed onto the photographed video image. The bit map data generation unit 103 also has a function for decoding the bit map data which was generated by run-length encoding.

A TS multiplexing unit 104 TS packetizes the image data encoded by the codec 102 and the bit map data encoded by the bit map data generation unit 103 and multiplexes the obtained TS packets, thereby generating a TS stream. The TS multiplexing unit 104 also has a function for demultiplexing the multiplexed TS stream.

A buffer memory 105 temporarily stores the TS stream which is output from the TS multiplexing unit 104 and is used as a buffer for writing into a recording medium 107 or a work memory of the control unit 100.

A recording medium control unit 106 controls the writing of the TS stream from the buffer memory 105 to the recording medium 107 in the recording mode. The recording medium control unit 106 controls the reading of the TS stream from the recording medium 107 into the buffer memory 105 in the reproducing mode.

The recording medium 107 is constructed by a flash memory or the like for storing the TS stream.

A GPS (Global Positioning System) unit 108 obtains GPS information.

A display unit 109 displays the image photographed by the camera unit 101, the video image reproduced from the recording medium 107, or the like. The display unit 109 also displays various kinds of necessary images such as a setting display screen and the like under control of the control unit 100.

In addition to the above construction, a communication interface (not shown) for transmitting the generated TS stream to an external apparatus may be provided.

Subsequently, the recording operation of the moving image will described. The recording operation is performed by loading a control program which has previously been installed in a memory (not shown) into the control unit 100 and executing it.

When a recording instruction is received from a user interface (not shown), the moving image recording apparatus in FIG. 1 starts the moving image recording operation. The control unit 100 drives the camera unit 101. First, the camera unit 101 converts the photographed image into digital data (image data) and outputs to the codec 102.

Thus, the codec 102 is driven by the control unit 100 and encodes the image data which is input from the camera unit 101 and outputs the encoded data to the TS multiplexing unit 104.

At the same time, the bit map data generation unit 103 is driven by the control unit 100 and generates and encodes the bit map data which is superimposed onto the photographed image and outputs the encoded data to the TS multiplexing unit 104. The bit map data which is generated will be described hereinafter.

The TS multiplexing unit 104 generates the TS packets by packetizing the data encoded by the codec 102 and the data generated and encoded by the bit map data generation unit 103. The TS multiplexing unit 104 multiplexes those TS packets into one TS stream and stores into the buffer memory 105.

Subsequently, the control unit 100 controls the recording medium control unit 106 and records the TS stream data stored in the buffer memory 105 to the recording medium 107 as an Audio-Visual (AV) stream file.

From the TS stream data recorded in the recording medium 107, the image data and the bit map data can be reproduced by the operation processing which reversely performs the recording processing operation mentioned above. In this case, a demultiplexer circuit for executing the processing opposite to the multiplexing is a well-known technique and the decoding can be realized by a decoding function of the codec 102.

Subsequently, the bit map data which is generated by the bit map data generation unit 103 will be described. In the present embodiment, photography date and time, GPS information, a photographer, a time code, focus information, and exposure information are generated as bit map data (a plurality of additional information). The bit map data generation unit 103 obtains the information regarding the photography date and time and the time code serving as a foundation of the bit map data from a calendarial function unit and a time management unit (not shown) held in the control unit 100. The generation unit 103 obtains GPS information which is the basis of the bit map data, from the GPS unit 108. The generation unit 103 also obtains the focus information and the exposure information serving as a foundation of the bit map data from the camera unit 101. The information of the photographer serving as a foundation of the bit map data is determined on the basis of setting information instructed by the user through a setting display screen displayed in the display unit 109.

In the invention, the bit map data is classified every object as follows.

Classification into data having a high correlation with a moving image frame and data having a low correlation therewith Data having a high frame correlation: photography date and time, GPS information, and photographer Data having a low frame correlation: time code, focus information, and exposure information The data having a low frame correlation is classified every frame into data which needs to be updated and data which does not need to be updated.

Updating is necessary every frame: time code (frame), focus information, and exposure information Updating is unnecessary every frame: time code (hour, minute, second)

Further, the data whose updating is unnecessary every frame is classified every I-picture (encoding type) and every hour (photographing time).

Every I-picture: time code (minute, second)

Every time: time code (hour)

Thus, the bit map data is classified into the following five objects in accordance with the update period.

Photography date and time, photographer, and GPS information—object 1—every photographing scene Focus information and exposure information—object 2—every frame Time code 1 (frame)—object 3—every frame Time code 2 (second, minute)—object 4—every I-Picture Time code 3 (hour)—object 5—every hour FIGS. 3A and 3B illustrate an example of a display of the bit map data superimposed onto the moving image. This display can be performed by reproducing and displaying, for example, the TS stream recorded on the recording medium 107 under control of the control unit 100.

FIG. 3A illustrates a template adapted to specify a display position of the bit map data of each object and a data display format in the display area. FIG. 3B illustrates an example of a display screen at the time when the bit map data is superimposed onto the image data. The display format of FIG. 3A is preset or can be properly selected from a plurality of settings by the control unit 100 and a user interface and the like (not shown). The bit map data which is superimposed and displayed is updated by the following construction.

FIGS. 4A and 4D illustrate a conceptual diagram of an AV stream to be recorded onto the recording medium 107. FIG. 4A shows the AV stream, and FIGS. 4B to 4D show the bit map data of the objects to be superimposed on respective frames of the AV stream.

As illustrated in FIGS. 4A to 4D, the bit map data of all of the objects 1 to 5 shown in FIG. 4B are superimposed onto the start frame 400 and 404 shown in FIG. 4A. The bit map data of the object 5 is superimposed onto the subsequent frames every hour, the bit map data of the objects 2 to 4 shown in FIG. 4D are superimposed every I-picture frame 402, 403 and 405 shown in FIG. 4A, and the bit map data of the objects 2 and 3 shown in FIG. 4C are superimposed every frame 401 shown in FIG. 4A.

The information of the photographer is preset by a user interface using the display unit 109 and is saved into an area of the buffer memory 105, which is used as a work memory of the control unit 100.

The ingenerateation of the photography date and time is obtained from the calendarial function unit held in the control unit 100 and is saved into the area of the buffer memory 105, which is used as a work memory of the control unit 100.

At the start of the recording, the GPS information is obtained from the GPS unit 108 in response to an instruction from the control unit 100 and is saved into the area of the buffer memory 105, which is used as a work memory of the control unit 100 of the buffer memory 105.

As for the focus information and the exposure information (photographing condition), the information which is generated by the camera unit 101 and output to the control unit 100 is sent to the bit map data generation unit 103 every frame.

The time code is generated by the control unit 100 and sent to the bit map data generation unit 103 every frame.

After the start of the recording, the control unit 100 sends a generating instruction of the object 1 to the bit map data generation unit 103 at the timing when the head frame is encoded by the codec 102.

At the same time, the control unit 100 sends photography date and time, the address and size of the buffer memory 105 in which the data of the photographer is held, and the GPS information. The bit map data generation unit 103 reads out the photography date and time and the information of the photographer from the buffer memory, generates the object 1 from those data and the data sent from the GPS unit 108 and encodes it.

Similarly, the control unit 100 sends a generating instruction of the objects 2 and 3 to the bit map data generation unit 103 at the timing when each frame of the image data is encoded by the codec 102. At the same time, the data of the frame portion of the time code generated in the control unit 100 is sent to the bit map data generation unit 103. The bit map data generation unit 103 uses the information which is output from the camera unit 101 to the control unit 100 as focus information and exposure information, uses the information generated in the control unit 100 as a time code, generates the objects 2 and 3 so as to superimpose them every frame, and encodes them.

Similarly, the control unit 100 sends a generating instruction of the object 4 to the bit map data generation unit 103 at the timing when the image data is I-picture encoded by the codec 102. At the same time, the data of second and minute of the time code generated in the control unit 100 is sent to the bit map data generation unit 103. The bit map data generation unit 103 generates the object 4 so as to superimpose it every I-Picture of the image data on the basis of the sent data, and encodes it.

Similarly, the control unit 100 sends a generating instruction of the object 5 to the bit map data generation unit 103 at the timing when the frame is encoded by the codec 102 every unit time. At the same time, the control unit 100 sends the time data of the time code to the bit map data generation unit 103. The bit map data generation unit 103 generates the object 5 so as to superimpose it every unit time on the basis of the sent data, and encodes it.

After that, the stream generated by the foregoing multiplexing processing is recorded onto the recording medium 107 as described before.

According to the embodiment of the invention described above, the additional information of the image data is classified in accordance with the update period and the overlay bit map data of each of the classified information can be multiplexed on the image data at the update period thereof. Thus, since a data amount of the additional ingenerateation which is multiplexed every frame of the moving image can be decreased, an affect on the bit rate caused by the increase in data amount of the image data, can be reduced. Therefore, while maintaining resolution of the moving image, the moving image stream can be generated with the necessary additional information being added.

In the foregoing embodiment, the image processing of the invention has been described with respect to the recording data processing of the moving image recording apparatus.

However, the image processing of the invention is not limited to the recording processing. For example, the processing of the invention can be applied even to a processing for displaying the photographed moving image and the additional information as illustrated in FIGS. 3A and 3B or a processing for transmitting the stream to an external apparatus. Also in this case, a decrease in processing speed can be avoided and a smooth display and a transmission rate can be maintained. Information other than the foregoing information can be also used as additional information.

Further, even in the case where the stream data recorded or transmitted by using the invention is displayed, since the data amount of the multiplexed additional information per frame is small, an advantage similar to that of the stream generating processing can be obtained.

Second Embodiment

Figure 6:
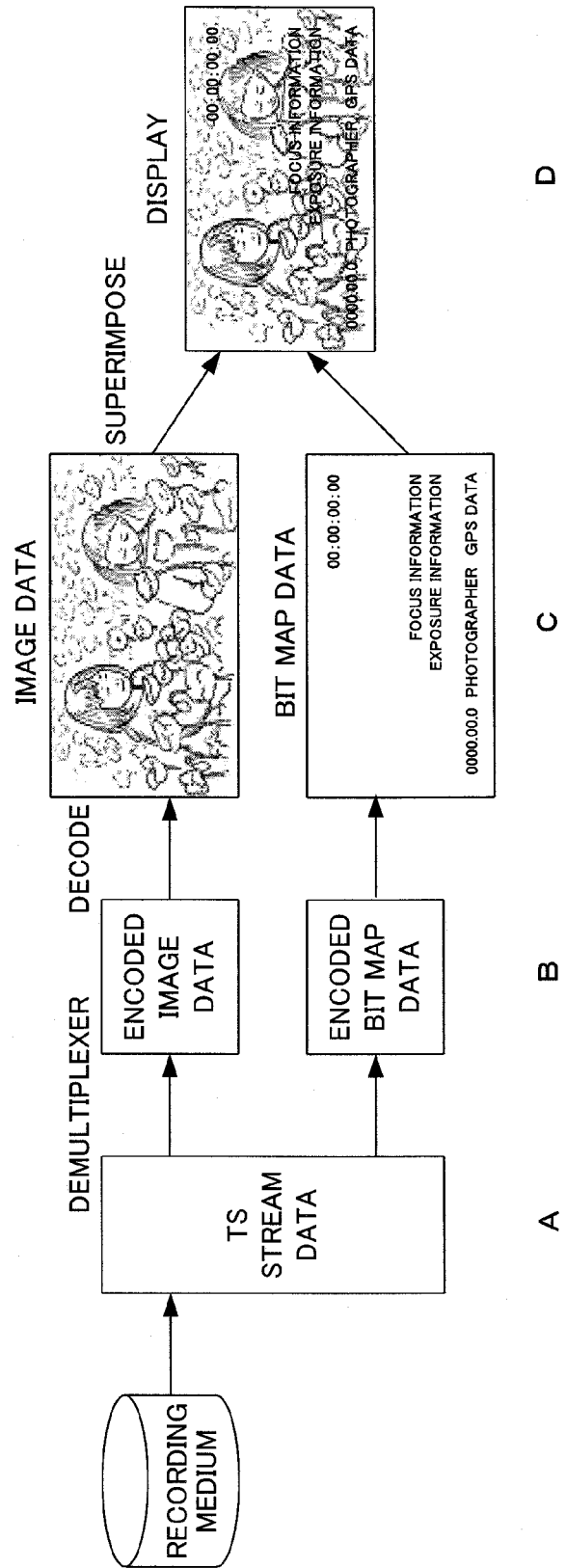
FIG. 6 is a diagram illustrating contents in a buffer memory in the reproducing operation according to the second embodiment of the invention.

Subsequently, the reproducing operation of the AV stream file recorded by the moving image recording apparatus having the image processing apparatus according to the first embodiment will be described as a second embodiment of the invention with reference to FIGS. 5 and 6. FIG. 5 is a block diagram of a reproducing apparatus having an image processing apparatus according to the second embodiment of the invention and illustrates a block construction along a processing flow. FIG. 6 is a diagram illustrating the contents in the buffer memory 105 in the operation of the reproducing apparatus in FIG. 5. In the construction illustrated in FIG. 5, the same blocks as those illustrated in FIG. 1 are denoted by the same reference numerals. That is, since the blocks 101 to 109 illustrated in FIG. 5 are the same as the blocks shown by the same reference numerals in FIG. 1, their description is omitted here.

Since the reproducing operation in the embodiment is the reproducing operation of the TS stream recorded by the recording operation described in the first embodiment, it can be realized by reversely performing the recording operation as mentioned above. The reproducing operation in the present embodiment is also realized by loading a control program which is previously installed in the memory (not shown) to the control unit 100 and executing it in a manner similar to the first embodiment.

The reproducing operation in the embodiment will be described in detail hereinbelow with reference to the drawings.

When the reproducing apparatus receives a reproducing instruction from a user interface (not shown), the reproducing operation is started.

The control unit 100 controls the recording medium control unit 106, reads out the AV stream file recorded on the recording medium 107, and writes as TS stream data into the buffer memory 105 (A in FIG. 6).

Subsequently, the control unit 100 instructs the TS multiplexing unit 104 to read out the TS stream data written in the buffer memory 105. The TS multiplexing unit 104 which received the instruction reads out the TS stream data from the buffer memory 105, separates it into the encoded image data and the encoded bit map data by demultiplexing, and subsequently writes back those data into the buffer memory 105 (B in FIG. 6).

Subsequently, the control unit 100 issues an instruction to the codec 102 to read out the encoded image data written back to the buffer memory 105. Further, the control unit 100 issues an instruction to the bit map data generation unit 103 to read out the encoded bit map data written back to the buffer memory 105. At this time, if the encoded bit map data is not updated with respect to each frame of the encoded image data which is read out, the control unit 100 notifies the bit map data generation unit 103 that the data is not updated. When the AV stream in FIGS. 4A to 4D are generated, the control unit 100 instructs the updating timing of the bit map data to the bit map data generation unit 103 for every object. That is, since the bit map data has been generated and multiplexed for every object at the update timing, the bit map data is not multiplexed with respect to the frame in which the object to be updated does not exist.

In response to the instruction of the control unit 100, the codec 102 reads out the encoded image data from the buffer memory 105, decodes it, and writes back again the decoded data as digital image data into the buffer memory 105 (C in FIG. 6). Under the control of the control unit 100, if the encoded bit map data is updated, the bit map data generation unit 103 reads out the encoded bit map data from the buffer memory 105, decodes it, and writes back again the decoded data into the buffer memory 105 (C in FIG. 6).

As illustrated in C in FIG. 6, the bit map data generation unit 103 uses the buffer memory 105 as a frame memory and develops the bit map data to a memory position corresponding to the display position of the display image when it is written back to the buffer memory 105.

Subsequently, the control unit 100 issues an instruction to the display unit 109 to read out the digital image data written in the buffer memory 105 and the decoded bit map data. The display unit 109 which received the instruction reads out the digital image data and the decoded bit map data from the buffer memory 105, superimposes them to one image, and displays the image.

By repetitively executing the foregoing processings to each frame, the additional information is reproduced and displayed together with the moving image.

Figure 7:
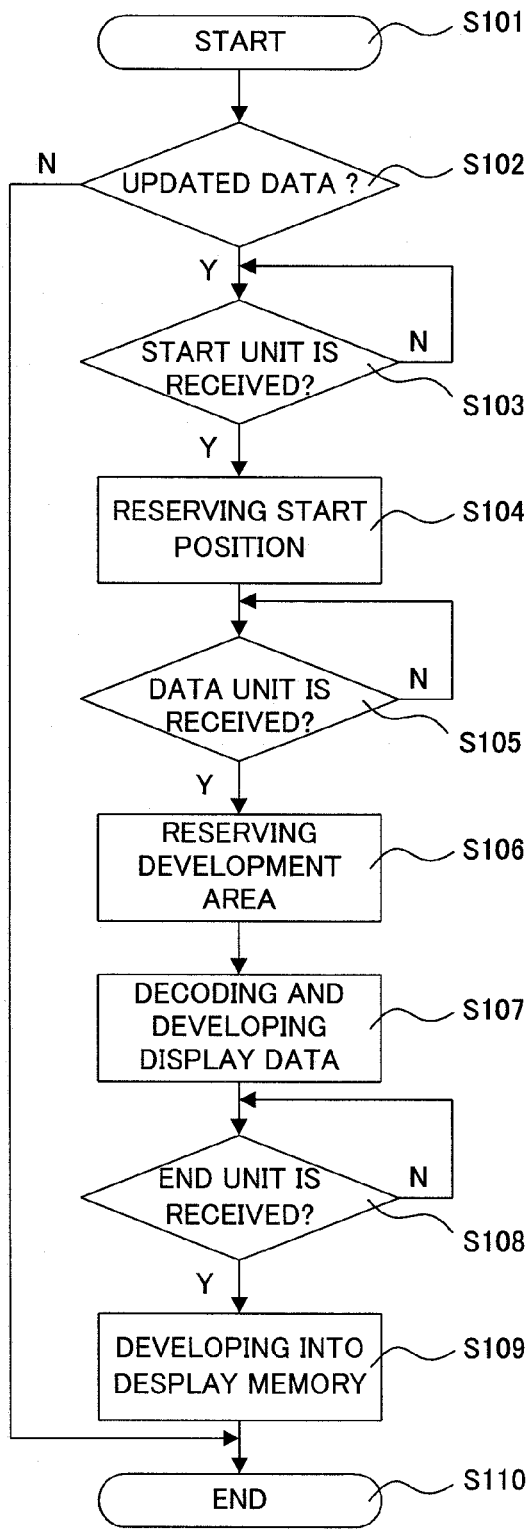
FIG. 7 is a flowchart of the operation of a bit map data generation unit in the reproducing operation according to the second embodiment of the invention.

Subsequently, the operation of the bit map data generation unit 103 in the reproducing mode will be described in detail with reference to FIGS. 7 and 8A to 8D. FIG. 7 is a flowchart for the operation of the bit map data generation unit 103 and FIGS. 8A to 8D illustrate the contents in the buffer memory in C in FIG. 6. When the control unit 100 instructs the bit map data generation unit 103 to read out the encoded bit map data from the buffer memory 105, the processing in FIG. 7 is executed by the bit map data generation unit 103 in response to such an instruction. The AV stream file which is reproduced is the file generated by the recording operation in the invention (FIG. 4).

When the control unit 100 instructs so as to read out the encoded bit map data written in the buffer memory 105, the processing of the present embodiment is started in step S701.

In step S702, the presence or absence of the data updating notification from the control unit 100 is discriminated. When the absence of the updating is ingenerated by the data updating notification, the processing routine advances to step S708 and the processing is finished. In this case, as for the display of the bit map data, since the display in the previous frame is not updated, the contents same as those in the previous frame are displayed.

Figure 8A:
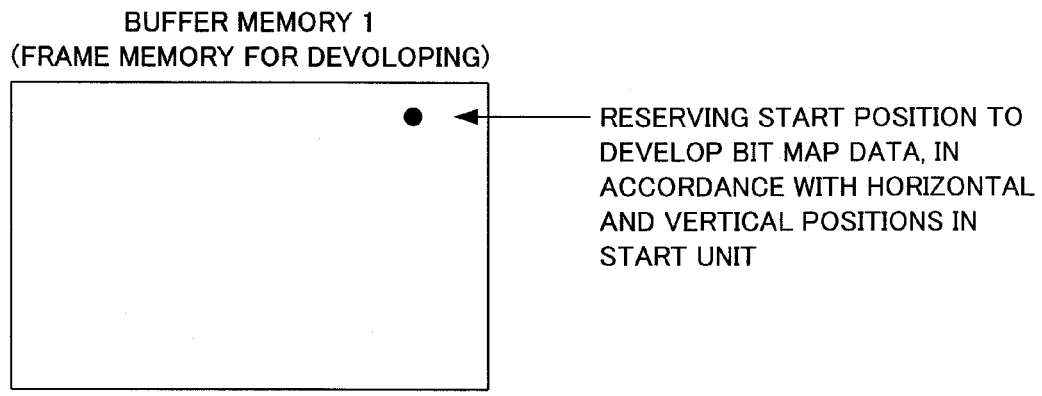

In step S703, a unit identifier of the encoded bit map data which is read out of the buffer memory 105 is discriminated based on an identifier showing the start unit. If the start unit identifier is discriminated as a result of the discrimination, in step S704, the corresponding position is reserved in a buffer memory 1 (frame memory for developing) in accordance with the horizontal and vertical positions on the display screen of the objects of the number as many as the number of objects included in the start unit which is read in (FIG. 8A). In the embodiment, as illustrated in FIGS. 8A to 8D, two frame memories 1 and 2 for writing back are prepared in the buffer memory 105. One (frame memory 1) of the frame memories 1 and 2 is used to develop the object and the other (frame memory 2) is used to display the object. As mentioned above, the start position of the object is reserved for the frame memory 1 for developing. FIGS. 8A to 8D illustrate an example of the reproduction processing at the time when only the time code (frame) of the object 3 recorded in the first embodiment is updated.

Figure 8B:
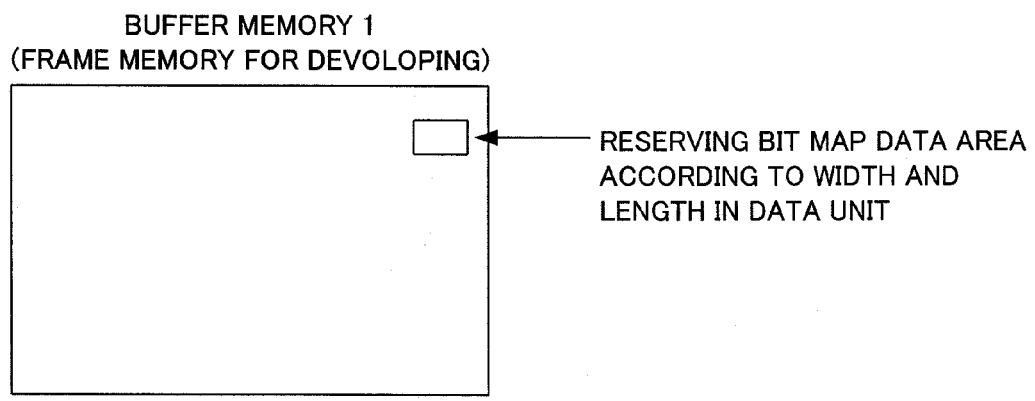

Subsequently, in step S705, the identifier of the encoded bit map data which is read in is discriminated by an identifier showing the data unit. If the data unit is discriminated as a result of the discrimination, in step S706, an area having corresponding width and length from the position reserved in step S704 is reserved in the frame memory 1 for developing in accordance with a width and a length of each object included in the data unit (FIG. 8B).

In step S707, the data included in the data unit is decoded and the bit map data is developed into the area reserved in the frame memory 1 for developing (FIG. 8C).

The processings until now are executed to the objects of the number as many as the number of objects included in the start unit.

In step S708, the unit identifier of the encoded bit map data which is read out of the buffer memory 105 is discriminated by an identifier showing the end unit. If the end unit is discriminated as a result of the discrimination, in step S709, the data developed in the frame memory 1 for developing is developed into the frame memory 2 for displaying. Thus, only the data of the objects developed in the frame memory 1 for developing is written (updated) among the bit map data stored in the frame memory for displaying.

In step S710, the processing is finished.

As described above, only the updated object in the bit map data which is superimposed into the reproduced moving image is rewritten and the data of the other objects which are not updated remain unchanged so that the same data as that of the previous frame are retained. The bit map data developed in the frame memory 2 for displaying is superimposed onto the image data decoded in the codec 102 and displayed by the display unit 109 as illustrated in, for example, FIG. 3B.

According to the second embodiment as described above, the reproduction processing of the additional information of the image data can be executed as an updating processing of only the updated object in accordance with its update period. Thus, since the load of the reproduction processing of the additional information which is multiplexed every frame of the moving image can be decreased, the affect on the bit rate, caused by the increase in data amount of the image data, can be reduced. Therefore, the moving image stream to which the necessary additional information is added can be reproduced while maintaining the resolution of the moving image.

Although the image processing of the invention has been described above with respect to the data reproduction display processing of the moving image reproducing apparatus, the invention can be also applied to a processing for receiving the transmitted stream and displaying it. Also in this case, since a data amount of the multiplexed additional information per frame is reduced, the decrease in processing speed can be avoided and the received image data can be smoothly displayed.

Further, information other than the foregoing information can be also used as additional information.

Although the invention has been described in detail above with respect to the exemplary embodiments, the invention is not limited to those specific embodiments but various modifications in a range without departing from the essence of the invention are also incorporated in the invention.

Naturally, the object of the invention is also accomplished by supplying a program code to a system or an apparatus from a storage medium in which the program code of software for realizing the functions of the embodiments mentioned above has been recorded. That is, the object of the invention is accomplished by a method whereby a computer (or a CPU or MPU) of the system or apparatus reads out the program code stored in the storage medium and executes processings based on the program code.

In this case, the program code itself read out of the storage medium realizes the functions of the embodiments mentioned above, and the program code itself and the storage medium in which the program code has been stored construct the invention.

As a storage medium for supplying the program code, for example, a flexible disk, a hard disk, an optical disk, a magnetooptic disk, a CD-ROM, a CD-R, a magnetic tape, a nonvolatile memory card, a ROM, or the like can be used.

The invention also incorporates a case where an OS (basic system or operating system) or the like which is operating on a computer executes a part or all of actual processings on the basis of instructions of the program code read out by the computer, so that the functions of the embodiments mentioned above are realized.

Further, the invention also incorporates a case where the program code read out of the storage medium is written into a memory provided for a function expanding board inserted in a computer or a function expanding unit connected to the computer and is executed after that. That is, the invention also incorporates a case where a CPU or the like provided for the function expanding board or the function expanding unit executes a part or all of actual processings on the basis of instructions of the program code in the memory and the functions of the embodiments mentioned above are realized by those processings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-124175 filed on May 31, 2010 and No. 2011-065787 filed on Mar. 24, 2011, which are hereby incorporated by reference herein in their entirety.

What is claimed is:

1. An image processing apparatus comprising:
  an input unit configured to input image data;
  a data generation unit configured to generate data of a plurality of additional information regarding the image data input by the input unit;
  an image processing unit configured to generate stream data by multiplexing the data of the additional information generated by the data generation unit and the image data; and
  a control unit configured to control the data generation unit such that the plurality of additional information are classified into a first object which has a first update period and a second object which has a second update period different from the first update period, the data of the additional information corresponding to the first object is generated and output with the first update period, and the data of the additional information corresponding to the second object is generated and output with the second update period, wherein the image processing unit multiplexes to the image data the data of the additional information corresponding to each of the first and second objects which is output from the data generation unit with update period of the each of the first and second objects.

2. An apparatus according to claim 1, wherein the data generation unit generates encoded bit map data with respect to each of the plurality of additional information.

3. An apparatus according to claim 1, wherein the plurality of additional information include at least one or more of photography date and time, GPS information, a photographer, a time code, focus information, and exposure information, and wherein the control unit classifies the additional information by using as the first and second update periods a scene of the image data, a frame, an encoding type of the frame, and a photographing time.

4. An apparatus according to claim 1, wherein the control unit supplies each of the plurality of additional information to the data generation unit with the first and second update periods.

5. An apparatus according to claim 1, further comprising a photographing unit configured to generate the image data, and wherein the photographing unit supplies information regarding a photographing condition to the control unit.

6. An apparatus according to claim 1, wherein the data of the additional information which is generated by the data generation unit includes area data showing an area of each of the first and second objects to be updated, on an image corresponding to the image data, and updated data of each of the first and second objects, and the image processing apparatus further comprises a recording unit configured to record the stream data generated by the image processing unit onto a recording medium.

7. An apparatus according to claim 1, further comprising a display unit configured to display a moving image corresponding to the stream data which is output from the image processing unit, and wherein the control unit controls the display unit such that the additional information is superimposed to the moving image and displayed.

8. A control method of an image processing apparatus having an input unit configured to input image data and a data generation unit configured to generate data of a plurality of additional information regarding the image data input by the input unit, comprising:

generating stream data by multiplexing the data of the additional information generated by the data generation unit and the image data; and controlling the data generation unit such that the plurality of additional information are classified into a first object which has a first update period and a second object which has a second update period different from the first update period, the data of the additional information corresponding to the first object is generated and output with the first update period, and the data of the additional information corresponding to the second object is generated and output with the second update period, wherein in the image processing step, the data of the additional information corresponding to each of the first and second objects which is output from the data generation unit with update period of each of the first and second objects is multiplexed to the image data.

9. A non-transitory computer readable storage medium storing a program comprising a code for causing a computer to execute the control method according to claim 8.

* * * * *